United States Patent [19]

Hasselmann

[11] Patent Number: 4,827,762
[45] Date of Patent: * May 9, 1989

[54] SYSTEM AND METHOD FOR AUTOMATICALLY MONITORING LIQUID VOLUME CHANGES IN STORAGE TANKS

[76] Inventor: Detlev E. M. Hasselmann, 519 S. Nardo Ave., Solana Beach, Calif. 92075

[*] Notice: The portion of the term of this patent subsequent to Jun. 16, 2004 has been disclaimed.

[21] Appl. No.: 65,164

[22] Filed: Jun. 15, 1987

Related U.S. Application Data

[63] Continuation-in-part of Ser. No. 748,926, Jun. 26, 1988, Pat. No. 462,842.

[51] Int. Cl.$^4$ .............................................. G01M 3/26
[52] U.S. Cl. .................................... 73/49.2; 364/564
[58] Field of Search ............ 73/149, 99.2, 40, 40.5 R, 73/290 R, 292; 364/564, 550, 558, 521; 374/4; 137/386, 391; 340/605

[56] References Cited

U.S. PATENT DOCUMENTS

| | | | |
|---|---|---|---|
| 1,417,892 | 5/1922 | Ehrentraut | 73/292 |
| 1,777,415 | 10/1930 | Morgan | 374/142 |
| 2,677,276 | 5/1954 | Schmidt | 73/292 |
| 2,760,373 | 8/1956 | Quist | 73/317 |
| 2,902,859 | 9/1959 | Quist | 73/321 |
| 3,359,799 | 12/1967 | Lubin | 73/308 |
| 3,485,262 | 12/1967 | Perren | 137/386 |
| 3,538,745 | 11/1970 | Wright et al. | 73/49.2 |
| 3,580,055 | 5/1971 | White | 73/40.5 R |
| 3,841,146 | 10/1974 | Cross et al. | 73/49.2 |
| 4,140,254 | 2/1979 | Castillo | 137/386 |
| 4,186,419 | 1/1980 | Sims | 73/313 |
| 4,186,591 | 2/1980 | Mooney | 73/49.2 |
| 4,229,798 | 10/1980 | Rosie et al. | 364/564 |
| 4,281,534 | 8/1981 | Hansel | 73/49.2 |
| 4,300,388 | 11/1981 | Hansel et al. | 73/49.2 |
| 4,362,403 | 12/1982 | Mooney | 374/4 |
| 4,386,525 | 6/1983 | Mooney | 73/49.2 |
| 4,660,586 | 4/1987 | Knapp et al. | 137/386 |
| 4,672,842 | 6/1987 | Hasselmann | 174/142 X |

FOREIGN PATENT DOCUMENTS 2835036  2/1980  Fed. Rep. of Germany ........ 73/292

OTHER PUBLICATIONS

Gimpel et al., "Computer Inventories Oil in Refining Tanks," Electronics, vol. 30, No. 10 (1957).
PEI Manual 83-1, "Tightness Testing Systems for Underground Tanks" (1983).
Burkhart, "Helium: An Advanced Method of Leak Detection" (1983).
"The Ainlay Tank Leak Tester" (1983).

Primary Examiner—Hezron E. Williams
Attorney, Agent, or Firm—Baker, Maxham, Jester & Meador

[57] ABSTRACT

A constant level automated liquid volume monitoring system and method for determining storage tank leak rate. Volume changes necessary to maintain storage tank liquid level, and volume changes due to temperature changes, are substantially constantly measured and calculations are made frequently and averaged periodically to provide updated leak rate indications for a system operator. By use of this system, real time statistical analysis can be achieved.

29 Claims, 8 Drawing Sheets

```
                0.000 ┌──────── SCALE FOR THERMISTOR TEMP ────────┐ 0.100

59°F ┌────────── SCALE FOR A,B,M,T TEMP. ──────────┐ 69°F

┌TIME OF DAY (MINUTES PAST MIDNIGHT)
            │                              ┌TOP TEMP.     VOLUME
1299.77  >   │      X         │   BMT      │      +         │    A   V │  < 0.26
                                        ┌MID POINT TEMP.
  0.001  >   │      X         │   BMT      │      +         │      V A │  < 0.27
                                        ┌BOTTOM TEMP.
  0.001  >   │      X         │   BMT      │      +         │    V  A  │  < 0.27
                                                                  LEAK RATE (GAL/HR)
  0.001  >   │      X         │  B  MT     │      +         │    V   A │  < 0.27
                        ┌PLOTTED LEAK RATE
  0.001  >   │      X         │  B  M  T   │      +         │  V     A │  < 0.27
                  ┌LIQUID ADDED (GAL.)
  0.001  >   │      X         │   BM  T    │      +     V   │        A │  < 0.27
                                        THERMISTOR TEMP.
  0.001  >   │      X         │   BMT      │       + V      │        A │  < 0.28

0.001  >   │      X         │   BMT      │       +V       │        A │  < 0.28
                                                        AMBIENT TEMP.
  0.001  >   │      X         │   BMT      │     V +        │        A │  < 0.28

0.001  >   │      X         │   BMT      │    V +         │        A │  < 0.27

1305.   >   │      X         │   BMT   V  │      +         │        A │  < 0.26

0.001  >   │      X         │   BMT V    │      +         │        A │  < 0.26
```

FIG. 4

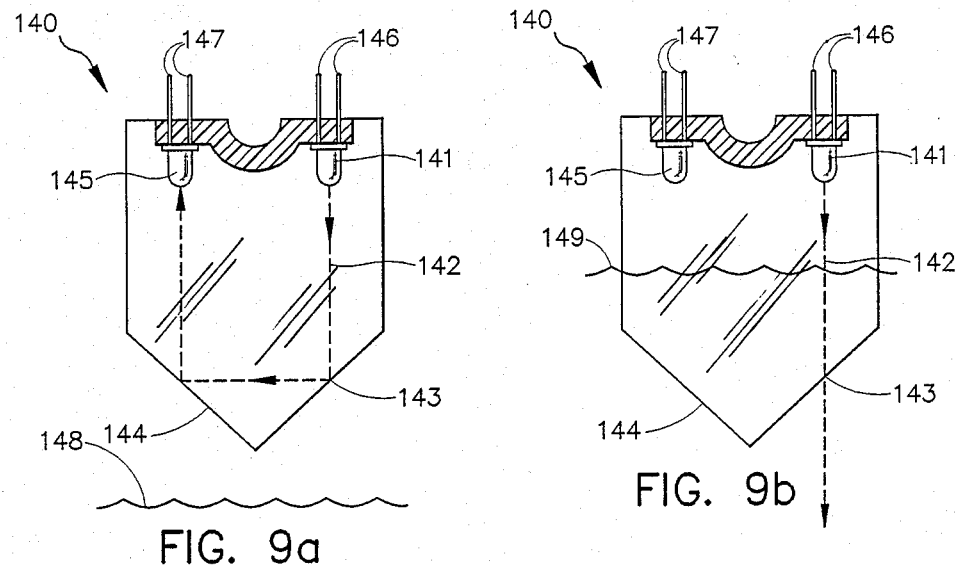
FIG. 9a
FIG. 9b
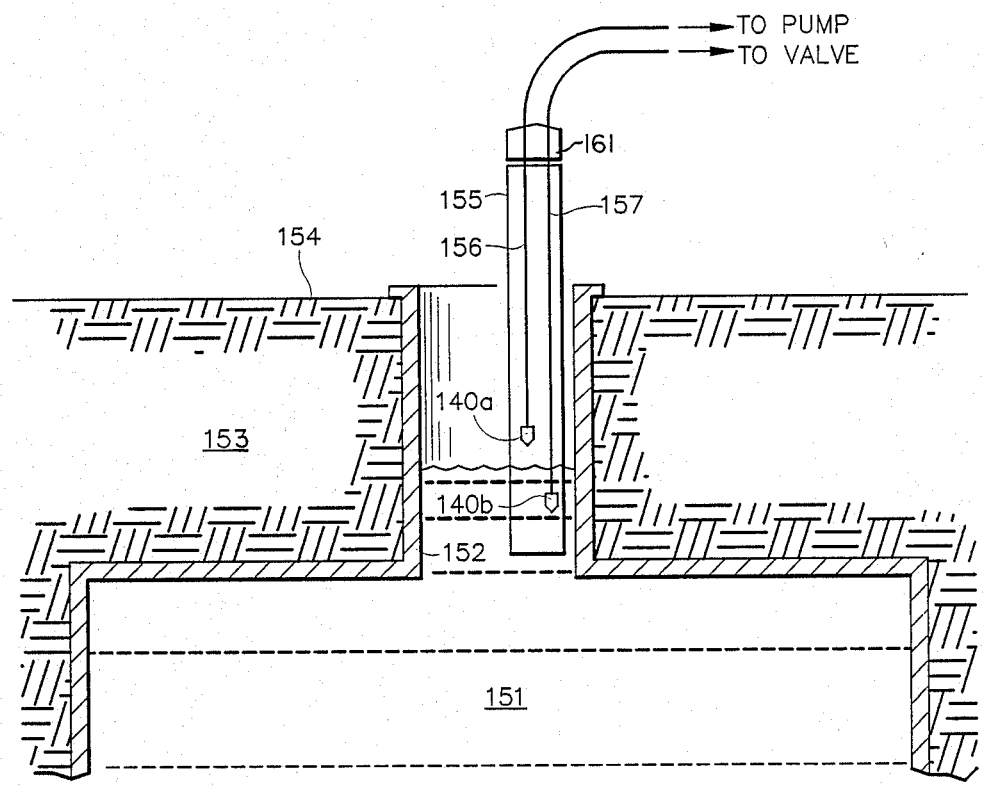
FIG. 10

SYSTEM AND METHOD FOR AUTOMATICALLY MONITORING LIQUID VOLUME CHANGES IN STORAGE TANKS

CROSS REFERENCE TO THE RELATED APPLICATION

This is a continuation-in-part of application Ser. No. 748,926, filed June 26, 1985, now U.S. Pat. No. 4,672,842.

FIELD OF THE INVENTION

This invention relates generally to liquid level monitoring systems and more particularly relates to a precise constant level automated system for monitoring liquid volume changes in a storage tank to determine leak rate in minimum time with maximum accuracy.

BACKGROUND OF THE INVENTION

Leaking underground storage tanks can be dangerous and costly. Where the tanks store fuel, leaks can mean loss of such valuable fuel and it can also mean contamination of surrounding soil and community drinking water supplies. At the present time, nominal leakage and product loss from fuel storage is usually acceptable from an operational standpoint, but is not acceptable for potential long-term environmental damage for the reasons stated above. Due to metering accuracy limitations, and the volumetric changes of petroleum products with temperature, inventory control data is usually inadequate for determining the existence of leaks. Therefore, verification of tank integrity requires the use of more precise measurement methods or monitoring procedures.

Several conditions can occur which require tests to determine the tightness of underground storage tanks and piping. Among the situations where such tests should be conducted are: in the course of a tank upgrading program; where there is a suspicion of a leak because of stock inventory loss; when leak monitoring indicates ground contamination; when there is an accumulation of water in the tank; and upon completion of construction.

Although many factors may cause an underground tank to leak, corrosion of the tank and piping have been determined to be the principle causes.

There are several typical leak locations in underground storage tanks, and several factors contribute to leaks occurring from these storage tanks. External tank corrosion is the greatest single factor leading to leaks. One of the major causes of tank corrosion is the corrosive potential of the soil caused by long-term location of unprotected underground steel takks in areas with high soil moisture content. Electrical conductivity of the soil appears to be one of the primary factors involved. Soil moisture content is an important condition which affects soil electrical conductivity and should be given special consideration in areas subject to high water tables, tidal fluctuations and high rainfall which may create high corrosion potential. Soil with a higher content of dissolved solids and salinity will also result in higher conductivity and therefore greater corrosion potential. In addition to soil moisture content, other site-specific factors such as buried metal objects and natural variations in soil characteristics, such as pH, can also contribute to the electrical potential at a given site. An additional factor is that lack of oxygen in the soil adjacent to the tank can enhance the growth of anaerobic bacteria which accelerates the corrosion process.

Improper installation practices can also lead to underground storage tank leakage and this would include improper preparation of the excavation pit which could result in tank rupture due to settling or uneven loads. Additionally, abrasion of the tank surface during installation can greatly increase the rate of localized corrosion.

Physical damage of the inside of the tank as a consequence of such factors as faulty management operations and inventory control operations can also contribute to leakage from underground storage tanks. An example of this is repeated contact at the same point in a tank by a dipstick while taking product level measurements, which can result in a weak spot in the tank.

Another contributing factor to possible leakage is age of the tank.

While fiberglass tanks are sometimes used, the majority of tanks are constructed of steel. This is because steel offers substantially lower installation costs. However, a substantial number of fiberglass tanks are in use and have significant potential for developing leaks. Installation stresses and settling are often the cause of leaks developing in these types of tanks.

It is important to realize that the piping associated with a tank, normally located at a level above the top of the tank, is often the location of storage tank leaks.

The current industry standard for threshold detection of leakage has been established by the National Fire Protection Association (NFPA) as 0.05 gallons per hour, regardless of tank size.

In detecting leakage, the impact of geometry is significant for large tanks. A small diameter but very tall tank is relatively easy to monitor since a small volume change will produce a relatively large liquid level change. However, most large storage tanks are constructed with large horizontal dimensions and limited height for a number of practical reasons. This means that large volume change in such a tank will produce a small change in liquid level, tending to reduce the accuracy of any computations based on level measurements.

Typical tank leakage monitoring systems currently available have a practical tank size limitation of approximately 20,000 gallons for the NFPA standard of detection. Because of the problems associated with geometry and total volume for larger tanks, a substantially higher threshold detection level for these tanks can still provide valuable information and also might be all that one could determine from present systems.

One of the major problems encountered in testing underground storage tanks is operator error. Several studies have identified and confirmed this error source. For example, with most previously available leak testing systems, the operator can incorrectly set up the equipment, misread data or can make leak rate calculation errors. The most likely but worst case result is a reported leak rate having errors that are undetectable.

Many of the systems presently available are relatively complex and require trained people who are very precise in all phases of the tank monitoring procedure. Also, many different types of devices are available, most of which measure absolute temperature and level changes in some way. One system works on the principle of buoyancy where the vertical position of a floating container is used in calculating volumetric changes. Others use sonic techniques, bubbling techniques, and still others use helium as a trace gas to detect leaks.

Most of the presently available leak monitoring systems for large storage tanks have one or more significant drawbacks. Many prior art systems require absolute temperature measurement, which is subject to substantially greater error than would result from measurement only of change in temperature, which is all that is really of interest. Additionally, large, cumbersome and relatively complex materials and equipment are necessary for many of the present systems. Further, skilled operators are frequently necessary and, as stated above, operator interpretation can lead to significant costs and errors.

SUMMARY OF THE INVENTION

In keeping with one of the major problems associated with tank leak testing, operator error, a goal of this invention is to remove the operator from the sample collection and data analysis functions. As set out below, this can be done by employing an appropriately programmed computer to interrogate sensors and then perform the necessary arithmetic calculations.

Broadly speaking, this invention is an automated underground storage tank leak detection system for determining whether or not liquid storage tanks and piping are tight. If there is a leak it provides accurate data as to the leak rate. This system meets the NFPA requirements of detecting leaks at least as small as 0.05 gallons per hour, regardless of tank size. In a preferred embodiment, this system measures leaks directly by maintaining a constant liquid level in the tank and measuring the amount of liquid that is added to or removed from the tank to keep the level constant.

The system is basically comprised of a level sensor which senses a level change and sends a signal to a computer when the liquid level in the tank changes. The sensor could be a float type, optical or other type which is capable of detecting a liquid level change. The computer then activates a positive displacement pump or equivalent means which adds or removes liquid from a storage tank in very small increments until the original liquid level is reached. The computer counts the incremental pump strokes to calculate the amount of liquid transported between the storage tank and an auxiliary tank. Alternatively, the auxiliary tank could be placed on or hung from a load cell which is monitored by the computer to detect all liquid volume changes resulting from the liquid transfers. In that instance incremental, positive displacement pumps would not be used since the liquid transferred is weighed directly and converted to volume.

The temperatures at the top, middle and bottom of the storage tank are measured by appropriate temperature sensors. Signals from these sensors are fed to the computer and used to detect the temperature changes within the storage tank. A single sensor located at about the center of the storage tank can be used to detect temperature changes in the tank. Studies have shown this location to be representative of the temperature changes occurring under some conditions and can be adequate for liquid volume change calculations due to temperature changes. However, for even greater accuracy under substantially all conditions, tests have shown that several vertically spaced sensor locations are necessary to give a truly representative indication of temperature change to accurately determine resultant volume changes. In one preferred embodiment the temperature change sensors are sensitive themistors. These thermistors are connected in one leg of respective Wheatstone bridges, the outputs of which are connected to the computer. The computer can read temperature changes of as little as 0.001° F., accurate to ±5%, from which it calculates an apparent leak caused by these temperature changes.

As inferred previously, many current methods of tank integrity monitoring measure actual temperature an subtract the values taken at timed intervals to get a value of temperature differential. However, this invention shows that the actual value of temperature is not important. It is the temperature change, $\Delta T$, that is of interest in determining volume change due to temperature change. For this reason, the present invention does not measure and subtract two large numbers to obtain $\Delta T$, but measures $\Delta T$ directly from a calibrated zero condition.

The leak determined by the liquid transported by the pump is adjusted in te computer by the apparent leak due to thermal changes to arrive at the actual leak amount. The computer also measures the time interval between measurements in order to calculate the leak rate.

All observed values are sampled about once per second and typically 45–50 of these values are averaged to periodically provide a visual display on a video screen or on a strip chart or both. Further, the data produced by the computer can also be stored on diskettes to provide a permanent record for future use along with the visual strip chart record. The strip has alpha/numeric information which may be provided by a conventional printer coupled to the computer output.

In an alternative embodiment, a floating rod coupled to a linear voltage differential transformer (LVDT) can be used to determine actual liquid level. The signals from the LVDT accurately represent liquid level changes and are coupled to the computer where they are converted to volumetric changes.

Still another embodiment determines the volume of liquid necessary to maintain constant liquid level by an accurate weighing system. The auxiliary tank is coupled with an accurate scale or a load cell having an output signal representing liquid volume changes. When the detected liquid level is low, a valve is opened to add liquid to the storage tank. It may also be pumped in. The difference in weight of the auxiliary tank is converted to liquid volume in the computer. This requires knowledge of density or specific gravity of the liquid in the auxiliary tank which must be accounted for in converting between weight and volume. When the detected liquid level is high, a pump is actuated to remove liquid from the storage tank and add it to the auxiliary tank. Thus, it can easily be appreciated that weight changes of the auxiliary tank are accurate indications of liquid volume changes in the storage tank.

There is also disclosed a novel method and apparatus for accurately and quickly determining when the tank has been filled and the liquid level is in the riser. A float rod with linear scale markings is provided in the riser. The volme of liquid for an increment change in level is constantly observed when the tank is nearly full. A rapid rise of the float rod with a small addition of liquid indicates that the liquid level is in the riser.

Referring again to potential operator error, by setting up the computer to obtain data and calculate results, this system substantially reduces the possibility of the operator manipulating the data and thereby the chances of errors occurring. In this system, if there is a problem with the test set-up the data will so indicate by showing unpredictable data variations. This allows a person not present at the test site to have confidence in the resulting data.

A somewhat modified procedure employing the principles of the invention is used to test the integrity of waste oil tanks and heavy Bunker C fuel oil. Because of the special problems associated with heavy or contaminated liquid, such as clogging pumps and valves, the test can be conducted with only a single liquid addition or removal.

The system and method of this invention, with a minor modification, can also be employed to test syphoned or coupled tanks. All that requires is temperature measurements in each tank, everything else being substantially the same.

In keeping with the constant level approach of this invention, the leak tests can be run at two different levels and a determination can be made as to the vertical location of the leak orifice.

The system of this invention is so sensitive and accurate that the existence and effect of vapor pockets in piping and in the top of the tank can be detected. Once their existence has been determined, appropriate steps can be taken to correct for them.

BRIEF DESCRIPTION OF THE DRAWING

The objects, advantages and features of this invention will be more readily appreciated from the following detailed description when read in conjunction with the accompanying drawing, in which:

FIG. 4 is a representative portion of a strip chart recording of the computer output over a period of several minutes;

FIG. 9A is a schematic representation of an optical sensor above the liquid level;

FIG. 9B is a schematic representation of the optical sensor of FIG. 9A below the liquid level;

FIG. 10 is a schematic representation of a test installation employing the optical sensors of FIG. 9.

DETAILED DESCRIPTION OF A PREFERRED EMBODIMENT

Figure 1:
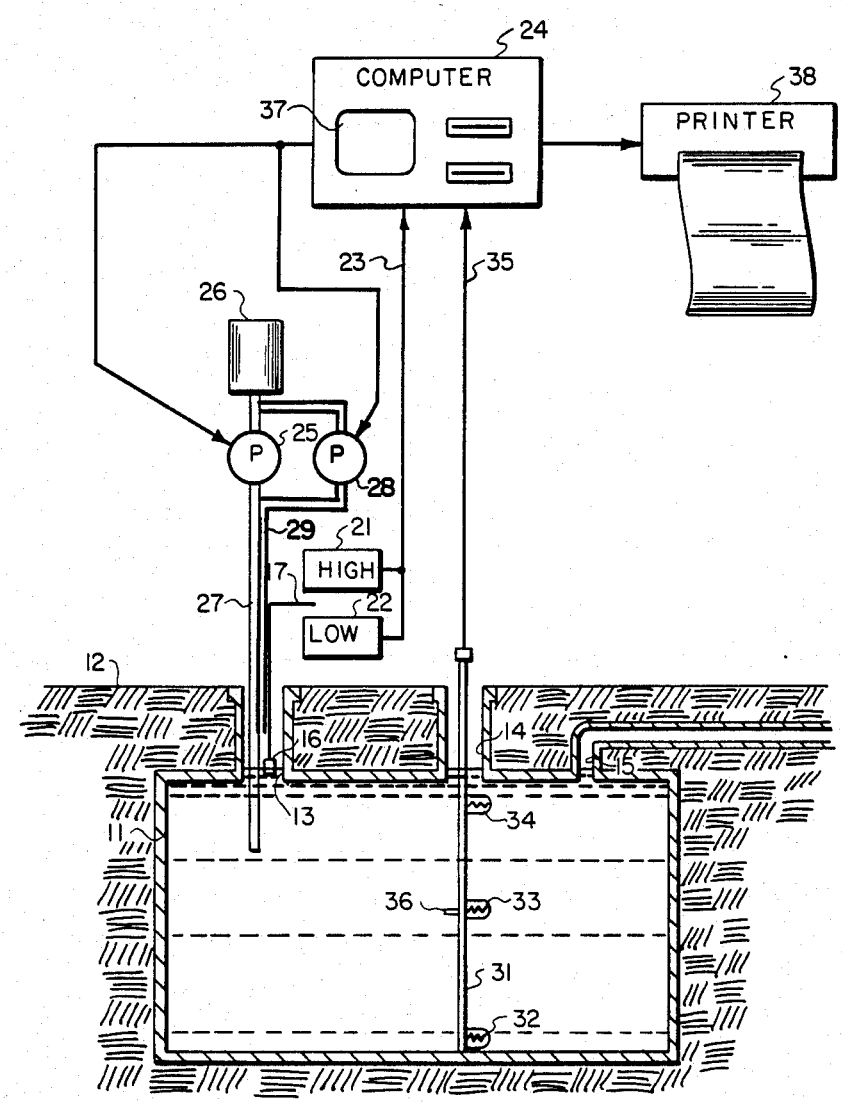
FIG. 1 is a schematic representation of the system of the invention in position with respect to a tank to be monitored.

With reference now to the drawing, and more particularly to FIG. 1 thereof, there is shown a storage tank 11 buried beneath ground level 12 and having accessible risers 13 and 14 extending upwardly from the top of the tank. Various conventional piping systems are indicated by the pipe 15 connected to the top of the tank. Typically, the top of the tank is about four feet below ground level and there are four or five top piping or riser openings, each of about four inches in diameter. One appropriate way to operate this system is for the level of the liquid in the tank to be just above the top of the tank, into the riser. At this location, the test is concerned only with the level of liquid in the tank and not in the piping, the major portion of which is normally located well above the top of the tank. An advantage of measuring at this location is that relatively small changes in liquid volume result in measurable level changes since the horizontal area of the piping at that level is quite small compared with the horizontal area of the tank itself. Because the tank and the riser are so closely connected as to be effectively integral, and tank liquid sensing and measurements frequently take place in and around the top of the tank and in the riser, the term "tank" will often be intended to include the riser.

Float device 16 is located in riser 13 and has an associated actuator 17 cooperatively arranged with HIGH and LOW sensors 21 and 22. These level sensors typically have a sensitivity of 0.05 inch (1.27 mm), allowing detection of as little as 0.01 gallon change in total volume in a tank having a storage capacity of many thousands of gallons. Signals from these sensors are coupled by means of line 23 to computer 24. When the level of the liquid in riser 13 falls sufficiently to be detected by LOW sensor 22, the computer sends a signal to pump 25, connected between auxiliary tank 26 and flow pipe 27 which extends into tank 11, to transport liquid from the auxiliary tank into the storage tank. The pump, preferably of the positive displacement type, is capable of transporting liquid in very small and acurate increments, such as 0.0005 gallons per stroke, and the computer measures the number of such increments necessary to maintain a constant level in the storage tank. Thus, when float 16 drops sufficiently to actuate LOW level detector 22, te pump will add liquid to the tank until actuator 17 moves upward sufficiently to deactuate the LOW sensor. Likewise, when the level in the tank rises such that actuator 17 engages HIGH sensor 21, a signal is sent to the computer which then actuates pump 25 to remove liquid from the storage tank and add it to the auxiliary tank. Similarly, the number of increments of fluid removed from the storage tank are counted and the total volume of liquid transported out of the tank is calculated by the computer. Although shown as a single pump and pipe, the invention contemplates an inlet pump and pipe 25, 27 and a separate outlet pump 28 and pipe 29. Pumps other than the positive displacement type also may be used. To add liquid, a solenoid valve may be used if the auxiliary tank above the storage tank is being weighed.

Optical sensors may replace the mechanically operated sensor apparatus of FIG. 1. Examples of appropriate optical sensors 140 are shown in FIGS. 9A and 9B, with a typical test installation shown in FIG. 10. A light radiating device such as diode 141 emits light as shown by dashed line 142. Normal refraction index in air (above liquid level 148) causes reflection of the light beam from surface 143 to surface 144 and back up to sensor 145. Leads 146 supply the necessary power and leads 147 transmit the resulting signals to the system apparatus for acting pursuant to liquid level changes. When the liquid level 149 is such as to cover the operable surfaces 143, 144 the change in the index of refraction causes the radiation on light beam 142 to continue through surface 143 and not be reflected back to sensor 145.

Thus, it can be clearly seen that optical sensors 140 are not only level sensors but are also on/off switches. When the liquid level changes the refraction index of faces 143, 144 the sensor ceases to conduct or to put out a signal on leads 147. When the liquid level is below those reflective faces, there is an active output on leads 147.

Sensors 140 may be mounted in the apparatus of FIG. 10, and placed at selective locations in the riser. The purpose of determining leak rate at two different liquid evels will be discussed later. Storage tank 151 has riser 152 extending through earth 153 to ground level 154. Tubular housing 155 is placed so that sensors 140a and 140b are at predetermined levels. High level sensor 140a may be vertically spaced from low level sensor 140b by any desired distance. For operation as contemplated herein, a spacing of as little as one fourth inch can be employed with useful results.

When the normally reflective surfaces of sensor 140b are immersed in the liquid there is no positive signal emitted over line 157. Likewise no signal exists in line 156 if sensor 140a is still above the liquid level as shown in FIG. 10. That would indicate to the control apparatus, such as pumps, solenoid valves or the computer controlling such elements that no liquid should be moved, that is, if it is desired to have the liquid level maintained between the two sensors.

The lines from the sensors are run through electrical connector 161 at the top of housing 155 and on out to the computer or directly to level modifying components such as a pump or a solenoid valve. For example, if both sensors 140a, 140b are immersed, liquid will be pumped out of the storage tank. If both sensors are above the liquid surface, liquid will be pumped in or allowed to flow in by means of a valve.

Figure 11A:
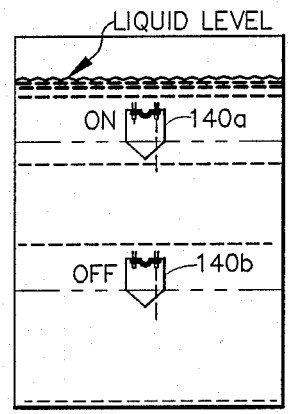
FIGS. 11A-11C show the different operating conditions of the two optical sensors of FIG. 10.
Figure 11B:
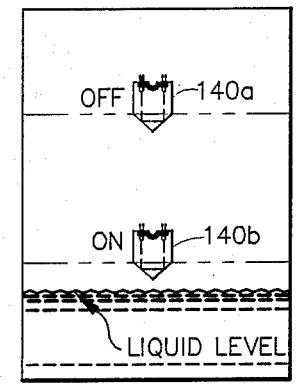
Figure 11C:
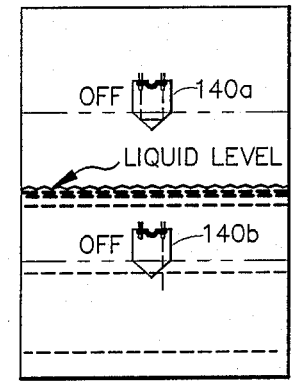

A preferred manner of operation of the optical level sensors is shown in FIGS. 11A, 11B and 11C, where the sensors are vertically spaced by 0.635 cm or about ¼ inch. In FIG. 11A, the liquid level is above both sensors. In this condition upper sensor 140a is said to be ON and lower sensor 140b is said to be OFF, causing removal of liquid. The liquid level is below both sensors in FIG. 11B so upper sensor 140a is OFF and lower sensor 140b is ON, thereby adding liquid. In FIG. 11C the liquid level is between the sensors, both are OFF and no liquid is moved. It should be noted that sensors 140a and 140b are electrically opposites.

Optical sensors of the type disclosed here typically have a sensitivity of 0.01 inch (0.25 mm), allowing detection of as little as 0.001 gallon in total volume in a storage tank holding thousands of gallons. An advantage of the use of optical sensors for the purpose described here is that they are not sensitive to angle. The float sensor device must be in a truly vertical riser but if the riser is at an angle it would have no effect on the accuracy of the optical sensor outputs.

Thermally caused volumetric changes in the liquid in the tank can be computed by applying the thermal coefficient of expansion to detected temperature changes. The accuracy of these volumetric computations depend on the accuracy of the temperature differential measurements.

Temperature probe 31 extends substantially to the bottom of the tank through riser 14. Although two risers are shown in FIG. 1, it is possible that both the level sensor and the temperature probe, as well as the flow pipe, could extend through a single riser. Temperature sensors 32, 33 and 34 are located on probe 31 at the bottom, middle and top of tank 11 respectfully, and the temperatures sensed by these detectors are fed to the computer by means of line 35. These temperature sensors may be any suitable device such as platinum resistance temperature detectors.

Sensitive thermistor 36 is connected, through line 35, as one leg of a Wheatstone bridge, the output of which is fed to computer 24 as will be discussed in greater detail with respect to FIG. 2. Based on temperature changes of the liquid in the tank, the computer determines the liquid volume change due to thermal expansion or contraction and balances that against the actual volume changes determined by the amount of liquid pumped in or out of the tank. The resultant information, including actual temperatures and actual volume of fluid transported between the tanks, together with a calculation of leak rate, is indicated on display 37, or alternatively on strip chart printer 38, or both. Clock means are provided in the computer to measure the time interval between measurements and thereby to calculate the leak rate.

Alternative temperature sensor means could be employed. One example would be a pressure sensitive bulb immersed in the liquid in the storage tank connected to the computer through a capillary tube. Pressure changes on the bulb caused by temperature changes can be converted to temperature change data and employed by the computer as described herein.

Figure 2:
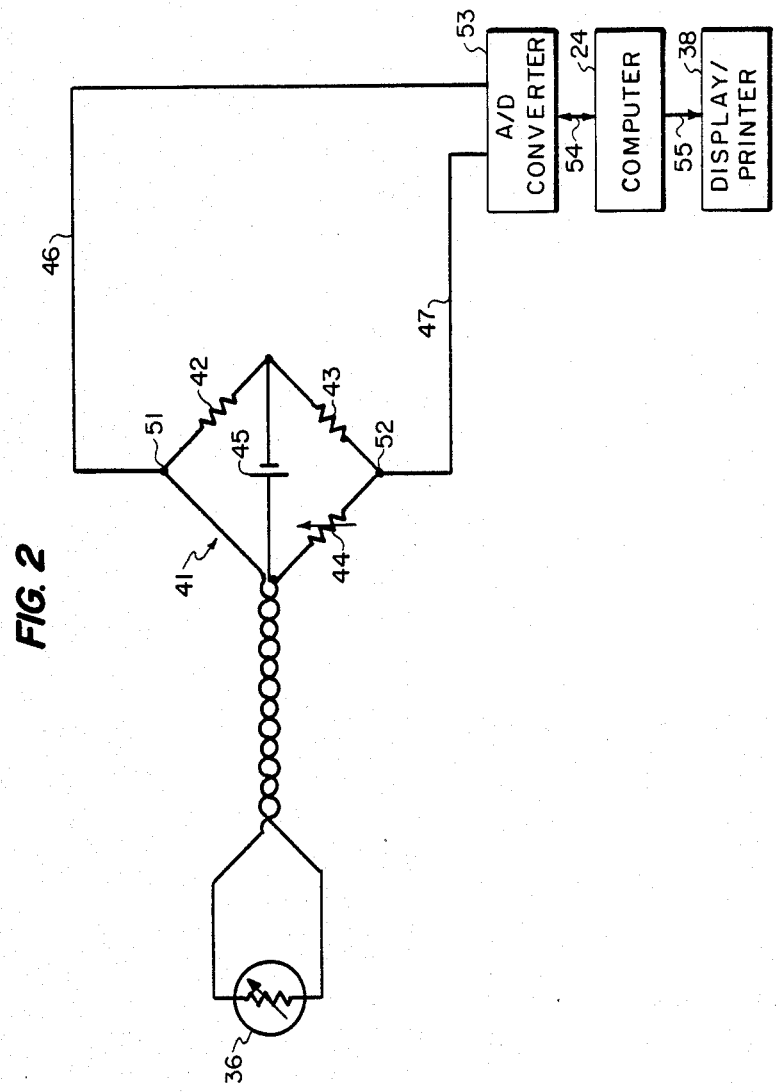
FIG. 2 is a partial schematic, partial block diagram of one embodiment of the temperature change measurement and calculation portion of the invention.
Figure 3:
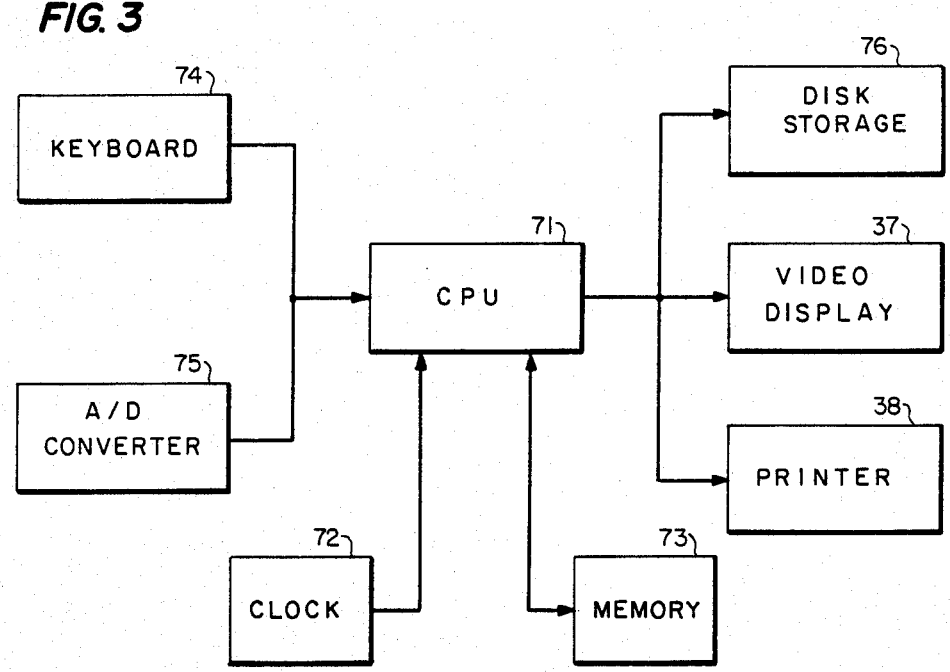
FIG. 3 is a block diagram showing the various components of the data handling portion of the system.

A block diagram of the basic computational portion of the system is shown in FIG. 3. Computer 24 includes a central processing unit (CPU) 71 having a real time clock input 72. Memory 73 contains all of the information needed for the CPU, together with its internal programming, to perform the desired functions. Certain information is entered in memory at the scene of the test as will be explained below with respect to the flow chart of FIG. 5. Other inputs to the CPU are from data entry keyboard 74 and analog-to-digital (A/D) converter 75. The converter may be the same as, or different from, or in addition to, A/D converter 53 of FIG. 2. There may be several analog inputs for the CPU which would go through a converter.

Outputs of the CPU include printer 38, video display 37 and disk storage 76. The disk storage not only provides archival storage of data, it permits the data to be recalculated at a later time. This could have value for detecting patterns since the data could be recalculated with even longer averaging times. It also allows further statistical analysis.

To further elaborate on the computations carried out by the computer, the basic values and equations involved are here set out in more detail. For a particular system and for a particular fluid stored in a tank, the information stored in the computer memory includes the coefficient of volumetric expansion, $K[(gallons)/(gallon-°F.)]$. The positive displacement pumps have the characteristics GI (gallons/stroke input) and GO (gallons/stroke output). At the beginning of a test run, an initial input is the storage tank volume, V, in gallons. Inputs to the computer, from actual real time measurements are:

SI = pump input strokes
SO = pump output strokes
T = temperature in °F.
t = clock time in hours.

One calculation performed by the computer is volume rate change due to liquid added or removed:

$$QL = \frac{(GI) \times (SI) - (GO) \times (SO)}{t_1 - t_2} \quad (1)$$

where $t_1 - t_2$ is a time increment during the test period. The related calculation is volume rate change due to temperature variations:

$$QT = \frac{(T_1 - T_2) \times (K) \times (V)}{t_1 - t_2} \quad (2)$$

where $T_1 - T_2 = \Delta T$.

Finally, from the above calculations, the computer determines leak rate (L) for the particular time increment:

$$L = QL - QT. \quad (3)$$

The extremely sensitive temperature variation ($\Delta T$) circuit is shown in FIG. 2. A Wheatstone bridge 41 has two legs with fixed resistors 42 and 43, a variable resistor 44 in one leg for calibration purposes, and thermistor 36 in the remaining leg. The bridge circuit can provide temperature differential readings accurate to four decimal places. A low, constant DC voltage source 45, typically 1.5 volts, is connected across the bridge as shown. Output lines 46 and 47 from bridge nodes 51 and 52 respectively are fed to A/D converter 53, the output of which is coupled, typically by an RS232 bus 54 to computer 24. An output of the computer may be coupled to printer 38, again possibly by RS232 bus 55. The term "Wheatstone bridge" should be understood to mean any equivalent circuit which can function in a similar way to provide useful and accurate signals in response to very little external change.

The volumetric coefficient of thermal expansion is a well known quantity for many liquids. The nominal value for gasoline is 0.00068 per degree F. This value can be determined even more accurately, if necessary, by measuring the temperature and applying the API (American Petroleum Institute) specific gravity index for each test.

It is important to note that the present invention computes volume variations due to directly measured temperature change rather than measuring actual temperature and subtracting one value from another, which is typical of other leak detector systems. This temperature change, $\Delta T$, is used with the appropriate value for the coefficient of expansion to calculate apparent liquid volume changes.

The Wheatstone bridge, with a precision thermistor in one leg, can provide precise, direct readings of $\Delta T$, sensitive to 0.001° F., accurate to ±5%. This extreme accuracy is possible because the system averages a relatively large number of calculations for each displayed result. Thus, 40 to 60 separate readings of bridge output signals are used to obtain a precise $\Delta T$ measurement, which is then employed in determining liquid volume changes due to temperature changes approximately once per minute or slightly more frequently. At the present time, 45 calculations appear to provide an adequate number of readings for accuracy, while taking a relatively short time. At this rate, four averaged displays can be made in three minutes, at the rate of about one temperature reading per second. Of course, readings can be taken more or less frequently and the number of calculations to be averaged could be varied. Changes in the number of calculations averaged for each displayed result can be adjusted by the operator in the field.

In instances where the central thermal sensor is not sufficiently accurate for the tests to be made, about 20–25% of tank installations, each sensor 32, 33, 34 can be coupled in its own bridge circuit and the computer can take into account weighted temperature change readings. For example, with the top and bottom sensors positioned about 12 inches from the respective top and bottom of the tank the significance of each sensor is about 15% for these two and about 70% for the middle sensor. These weighted values are simply added to give the composite temperature change reading. This is a volumetric weighting based on equalizing the vertical cross section.

It is important to note that a temperature change sensed by the Wheatstone bridge is based on a reference temperature. This means that the bridge is zeroed at the beginning of each test. The present system can measure to the accuracy mentioned over a normal ambient temperature range as opposed to prior art devices which read actual temperature to three decimal places but are only accurate to ±0.0015° F. Further, with actual temperature readings, errors may be cumulative. For example, a reading accurate to ±0.001° F. subtracted from another reading accurate to ±0.001° F. results in a possible error of ±0.002° F. Thus, with the kind of accuracy of the earlier devices, the subtraction may lead to substantial temperature errors, and consequent leak rate calculation errors.

In contrast with prior art systems which use a large thermometer scale to provide an actual reading of temperature, the present invention provides the temperature change, $\Delta T$, on a magnified thermometer scale which can be effectively moved all over the temperature range. Thermistor 36, because it is connected in a very sensitive Wheatstone bridge, can measure over a temperature range of a fraction of a degree, such as, for example, 0.100° F. It does not have to read the actual temperature, which would be several hundred times larger. For this reason $\Delta T$ may be determined to five decimal places with extreme accuracy. The readings provided by this invention are accurate to ±0.00005° F., and do not involve subtracting two numbers, each of which may be accurate to ±0.001° F., possibly resulting in cumulative errors.

An important distinction of this invention from many prior art systems is that the earlier devices take readings many minutes apart, some of them approximately 4–10 times per hour. The present system makes calculations at a much higher rate, approximately 3600 per hour, thereby contributing significantly to its ultimate accuracy. This advantage is made possible by the fact that the calculations of leak rate are made automatically, using a programmed microcomputer with its attendant high speed.

Another advantage stemming from the rapidity of measurements and calculations afforded by this invention is that trends can be determined much more quickly. This system can extract the necessary information in much shorter time intervals. If five data points are needed to establish a trend, this invention can provide the necessary information within five minutes. In tank monitoring systems which make calculations every 15 minutes, it would take 1¼ hours to obtain the necessary five data points.

This system can detect leaks which occur at rates less than 0.05 gallons per hour. Further, it provides an accurate reading of leak rate, rather than merely whether or not the threshold level of 0.05 gallons per hour has been exceeded. With this device, again as opposed to absolute temperature measuring devices, thermally related errors are significantly reduced and are not cumulative. Since $\Delta T$ is so accurately determined, any errors in volume calculations due to inaccuracies in temperature measurements are insignificant.

Temperature stratification in storage tanks is the optimum condition for minimizing effects of inaccurate temperature measurement. Temperature stratification can only be obtained when there is horizontal temperature equality, the far end of the tank will then have the same vertical temperature distribution as the end being measured. When temperature stratification is fully developed, normally some time after a tank is filled, there is no appreciable thermal agitation. This results in the various temperature layers acquiring a relatively uniform temperature change. This smooth temperature change is easily observed and compared with the temperature oscillations prior to stratification. The present invention measures the temperature at the top, middle and bottom of the storage tank by means of detectors 34, 33 and 32 respectfully. If desired, middle detector 33 could be omitted and only the top and bottom readings used, or only the middle sensors could be used because with developed stratification, temperature changes at the midpoint approaches the average temperature change throughout the tank.

It is possible to determine the amount of thermal agitation by detecting and recording the temperature readings. If the top temperature is colder than the bottom, it indicates that thermal agitation is present. This invention accounts for the effects of thermal agitation by continuously calculating the leak rate with the display clearly indicating when stratification has developed. Because it operates in this manner, the present invention can be employed as soon as the storage tank is filled, without having to wait for several hours to ensure stabilized temperature stratification. Even though the test will take somewhat more time if significant thermal agitation is present, the output display of the system shows when results start improving. Without a continuous readout, the operator would not know when stratification had occurred and unnecessary time could be expended to wait for it. With this system the operator can quickly determine when data is reliable and minimal time is required.

One benefit of having the actual temperature readings available is to assess the validity of temperature differential, $\Delta T$, values. If $\Delta T$ is fluctuating through relatively wide reading variations, both up and down, it could be evidence of thermal agitation. The different level temperature readings will confirm agitation if the top is colder than the bottom. Indications of developed stratification are relatively small and smooth changes in $\Delta T$ and temperature sensor readings with the top warmer than the bottom.

The only notable effect of thermal agitation is that the monitoring process must be run longer, until the calculated leak rates stop wide fluctuations, and there are approximately 15 minutes of relatively consistent leak rate readings. Even if there is significant agitation, the time for running the tests with the system, to obtain accurate leak rate data, is frequently as little as one hour and seldom would be expected to take more than two hours. Thus, the tank being tested is out of service for a relatively short time and the test results are very accurate and dependable.

There is another benefit from the fact that the present system maintains a constant liquid level which is just above the top of the tank in the riser. Many tanks have one or more vapor pockets at various uneven locations at the top of the tank and in the piping. One effect of the existence of vapor pockets is a sudden level change when the vapor escapes. This occurs when a liquid level change uncovers a vapor pocket and it often happens with previous monitoring systems because they depend on relatively large changes in level for their measurements and calculations. The system of this invention maintains a substantially constant liquid level to within 0.05 inch (1.27 mm), resulting in the virtual elimination of the opening or closing of vapor pockets.

Another aspect of vapor pockets is that their existence affects the leak rate data by causing an apparent "in" leak. This is caused not so much by temperature change or atmospheric pressure change but by evaporation of volatile components in the product being tested. Fresh gasoline has many light "ends" such as butane which have a high vapor pressure. These light "ends" evaporate into a vapor pocket causing it to expand. This expansion causes displacement of liquid product which appears as an "in" leak on the computed data.

Data from tests have shown that this expansion is at a cyclic rate. The result is that the compute leak rate also is cyclic and not constant. Thus the strip chart output is a cycling curve with its average value appearing as an "in" leak.

Vapor pockets must be eliminated in order to obtain reliable test results. This requires that all vent lines, pipe lines and other openings at the top of the tank be vented to atmosphere.

A factor frequently taken into consideration in measuring storage tank integrity is deflection of the tank ends. This factor is minimized in the present system by maintaining the liquid level minimally higher than the top of the tank and by allowing no more than 0.05 inch (1.27 mm) in level changes. Some systems require filling of standpipes to above grade and this can cause a significant pressure increase on the ends of the tank. Tank end deflection tends to occur rapidly at the beginning of a test before the tank has settled into an equilibrium state with respect to the soil in which it is buried. As the tank end deflection slows down to its final rest position, the apparent leak rate caused by that movement decreases. By continuously observing and recording the apparent leak rate, the system of this invention can determine when tank end deflection has decreased to the point where it has a minor effect on the leak rate. Because the present system only requires the tank to be filled just into the riser, tank end deflection has been determined to be insignificant for proper functioning of this system.

Typically, the computer samples the measurement signals from the temperature sensor and the volume displacement and adds or removes liquid once each second. The computer then averages 45 of these measurements, calculates the leak rate and displays the result on a video screen or on a strip chart printed by a standard alpha/numeric printer, or both, together with a precise time reading at the end of each 45 counts. The strip chart has time as the vertical axis and displays temperature readings, $\Delta T$, time, the amount of liquid added or removed and the calculated leak rate in figures as well as providing a graphical representation thereof. This is shown in FIG. 4. Additionally, the computer averages several minutes (typically 10-30) of leak rate values and then displays the moving average. Thus, the display shows readings every 45 seconds or counts and is refreshed with the average of the past 10-30 minutes and adjustments are made as necessary to insure that no readings go off the chart. Accuracy is enhanced because of the statistical results of taking a running average of the leak rate It is possible that data from a tank integrity test could be found to be statistically bad after commencing preparation of the final report for the tank owner That would entail redoing the entire test, at considerable expenditure in time and money. The system of this invention, by being able to obtain many data points, allows the calculation of real time statistical analysis. By applying standard deviation calculations to the immediately past 30 leak rate readings, the computer can determine if the data is statistically valid. If the leak rate is statistically valid, the computer can then compare the calculated leak rate value to the 0.05 gal/hr standard and determine "pass" or "fail" for each tank without requiring operator interpretation of the data.

Although there may be other acceptable ways to test the tank piping for integrity, this system can perform such tasks with great accuracy and efficiency. As indicated previously, the basic tests on the tank are conducted with the liquid level just above the top of the tank into the risers. Additional liquid can be added to the riser to fill the piping system in addition to the tank. A few readings on the strip chart recorder will very quickly show whether there is any difference in total system leak rate compared with the leak rate of the tank itself. Conversely, the tank could be filled all the way to the top of the piping system, readings taken, and then liquid removed to one or more different levels, depending upon the piping system or tank being monitored.

Figure 5:
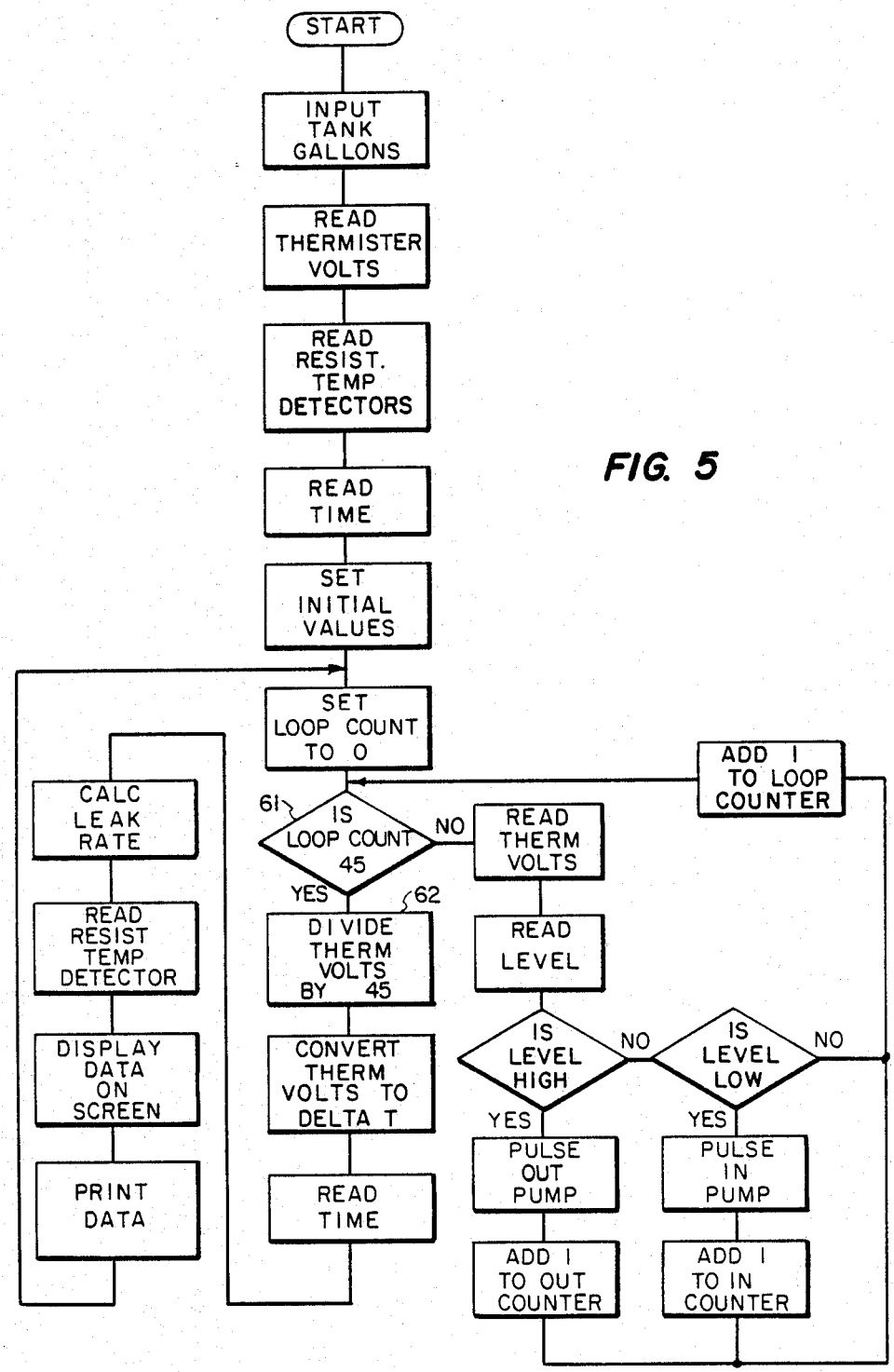
FIG. 5 is a flow chart of the program portion of the system.

The program in the computer is evidenced by the flow chart of FIG. 5. At the start of the process, initial values are set into the computer. The tank capacity in gallons is inserted manually. The computer automatically reads the thermistor value in volts, the actual temperature readings of the three temperature sensors and the time. After the initial values are set into the computer, the loop count is set at 0 readings. In block 61 the computer determines whether or not 45 readings have occurred. If the answer is NO, another set of values is read, including the thermistor volts and the liquid level sensors. If the level is high, that is, HIGH level sensor 21 has been actuated by actuator 17, a signal is sent to pulse the liquid level removal pump and for each pulse ONE is added to the positive volume counter. If the level is low, the other pump is pulsed and for each pulse ONE is added to the negative volume counter in the computer. For each set of readings, ONE is added to the loop counter, indicating that another set of readings was taken. When the total number of readings taken is equal to 45, the system proceeds to block 62 indicating that the thermistor volts are divided by 45 and converted to an average temperature change value. Then the time is read and from the arithmetic sum of the amount of liquid increments added to or removed from the tank, adjusted for temperature volume changes, the leak rate is calculated. At the same time, the temperature detectors are read and the various elements of information are shown on the video screen or are printed on the strip chart (see FIG. 4). It may also be recorded in a diskette for permanent storage. The system then resets to 0 count and goes through another 45 readings before new updated information is displayed.

Figure 6:
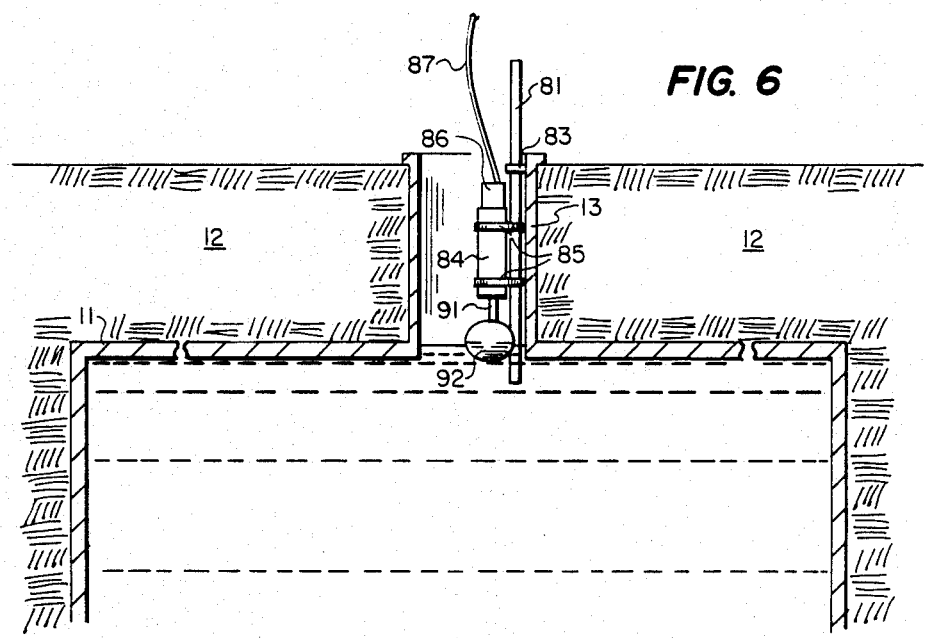
FIG. 6 is a schematic representation of an alternative level determining apparatus employing a linear voltage differential transformer.

The LVDT level measuring system is shown in FIG. 6. Rod 81 is attached to riser 13 of tank 11 by means of clamp 83. The outer sleeve 84 of the LVDT is secured to rod 81 by straps 85. The LVDT electronics are contained in housing 86 at the top of sleeve 84. Power in, typically 15 volts for the two separate inductive windings, and signals out, in the 5 volt range, are passed through wires 87. Level change indication signals from the LVDT would be coupled to the computer through the A/D converter. The output signals result from longitudinal movement of a small rod within a central bore through sleeve 84. A nonmagnetic extension of that central rod 91 extends downwardly, supported by float ball 92 at the liquid surface.

The LVDT is extremely accurate, sensitive to 0.0001 inch (0.00254 mm). Although shown in the riser, an LVDT can be used to measure liquid level in the tank. There may be times when it is desired to obtain tank integrity information when the liquid level is below the riser. With the LVDT, one may compute volume changes directly from detected level changes, without maintaining a constant liquid level. This requires a different volume computation step but the computer operates in the same general way as previously described. If desired, the constant liquid level technique could also be employed in conjunction with level change signals generated by the LVDT.

Figure 7:
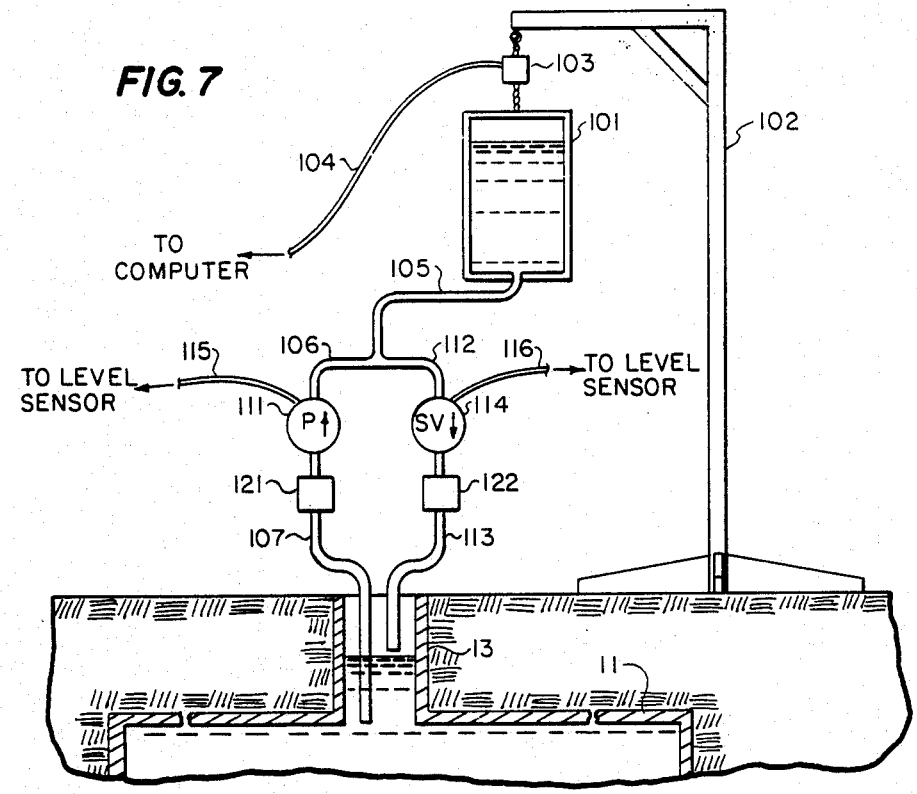
FIG. 7 is a schematic representation of an alternative embodiment of apparatus to measure liquid volume changes using a weighing system.

The preferred method for determining the volume of liquid needed to maintain constant liquid is shown in FIG. 7. Auxiliary tank 101 hangs from stand 102 through extremely accurate load cell 103. Electronic signals from the loa cell are coupled to the computer through wire 104. Liquid conduit 105 has branch 106 connected to outlet pipe 107 through pumps 111. Liquid conduit branch 112 is connected to inlet pipe 113 through solenoid valve 114.

A level sensor as shown in either FIG. 1 or FIG. 6 may be used in conjunction with this weighing system. Control signals from the level sensor are connected to the pump through wire 115 and to the solenoid through wire 116. Alternatively, control signals could be connected between the computer and the pump and solenoid valve for control thereof.

Another method for accurately measuring liquid added to and removed from the storage tank is by means of flow meters 121 and 122 in the respective outlet and inlet pipes. They may be used in place of either the incremental pump apparatus of FIG. 1 or the weighing system of FIG. 7.

Referring to the weighing system, when the tank level drops a detectable amount, a signal from the level sensor opens solenoid valve 114, allowing liquid to flow by gravity into the storage tank. Any of the means discussed may be employed to accuraely measure the volume of liquid transferred. When the liquid level in the tank rises a detectable amount, a signal from the level sensor starts pump 111 to remove liquid until the predetermined level is again achieved. In the preferred embodiment the computer only interrogates load cell 103 in the same manner as it interrogates the Wheatstone bridge for temperature information. With that information actual volume change is determined from the weight change and again compared with temperature caused volume change. Another factor that the computer needs as an initial input is the density or specific gravity of the liquid in the auxiliary tank. This is a conventional and well known requirement.

The load cell could be as simple as another Wheatstone bridge with a strain gauge in one leg in the same position as the thermistor in FIG. 2. Some load cells are sold with all of the electronics built-in to provide an accurate electronic signal output.

When employing the load cell, a somewhat different calculating sequence is used. The general flow chart for the computer program is shown in FIG. 5. Instead of counting pump pulses, load cell readings are employed. The computer continuously samples the storage tank temperature and the volume in the measuring cylinder or auxiliary tank for approximately one minute. At the end of this cycle, the computer determines the average temperature and weight for the cycle. Then the computer calculates the leak rate from the change in value from the previous cycle. To smooth out oscillations caused by the small time increments, the computer also calculates a running leak rate average for any desired number of past cycles, typically about 30 cycles. The operating sequence then repeats itself until the test is terminated by the operator.

The equation used by the computer to calculate the leak rate is as follows:

$$L = \frac{\left(\frac{W_2 - W_1}{\rho}\right) - [V_T \times K \times (T_2 - T_1)]}{(t_2 - t_1)} \tag{4}$$

where:
L = leak rate
W 32 measuring cylinder weight
$\rho$ = product density
$V_T$ = tank volume
K = coefficient of volumetric expansion
T = temperature
t = time The density (measured by hydrometer at the start of the test), the tank volume, and the coefficient of volumetric expansion are input as constants at the start of the test. All other values are measured by the computer.

The computer can run three tanks simultaneously. Each tank recording is turned on and off through keyboard entries between cycles.

The test data is printed out on a strip chart in real time. In addition, the test data is stored on a floppy disk for printing the test report submitted to the customer.

Figure 8:
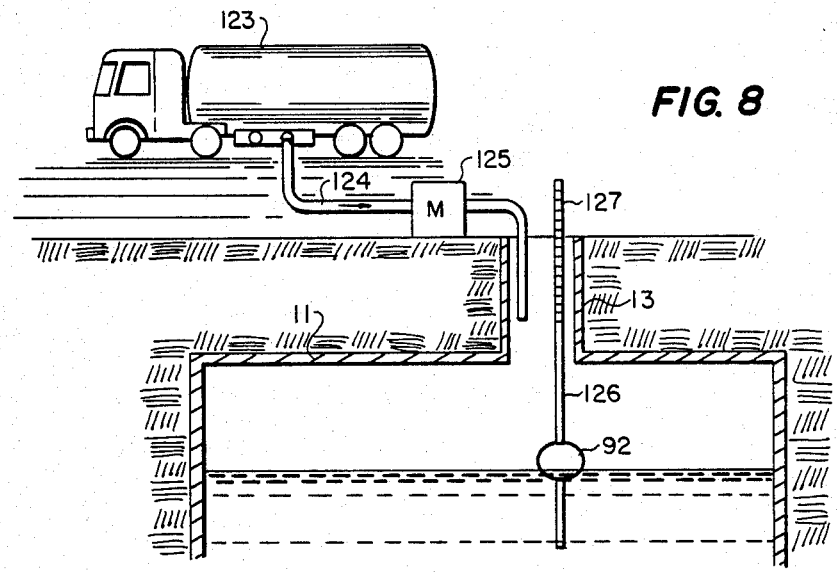
FIG. 8 is a schematic representation of the system for determining when the liquid level has reached the riser.

Apparatus for accurately determining when the tank is full and the liquid level has entered the riser is shown in FIG. 8. When the liquid level approaches the top of tank 11, float rod 126 is placed in riser 13 with scale markings 127 at the top of the riser. Tank truck 123 pumps liquid through hose 124 and flow meter 125 into the storage tank. As the liquid level approaches the riser, the flow meter readings are compared to the level readings. Near the top of the tank it is common to require 25-30 gallons to raise the liquid level by one inch. When the liquid level reaches the riser, as little as ¼ gallon can result in a one inch change in liquid level. Thus, by taking readings at every inch, it is easy to determine when the tank is full and the liquid has entered the riser. Measurements are continued as liquid level goes up in the riser, to indicate when the piping is being filled and to show how much volume is required for incremental lquid level changes at different levels.

Note that if the tank is not level, the fact that liquid is rising into the riser will not indicate a full tank until the air pockets are full. The rate of float rod rise may increase but the expected very rapid rise will not occur until only the riser or risers are being filled.

To simplify and reduce the possibility of operator error, a graph is provided with float rod height as the ordinate and gallons as the abscissa. A gentle upward slope is observed until the tank is filled, and then an abrupt rise is evident, unmistakably indicating that only the riser is being filled.

As the liquid level reaches and floods the horizontal pipes attached to the risers, the graph slope decreases or it levels out again. When the liquid has risen to the point where the pipes are completely flooded, the graph slope will again rise sharply. This provides a graphical image of the underground piping attached to the storage tank.

This procedure may also be used to determine the level of vapor pockets and vent piping attached to the tank. When the liquid level reaches the pipes, there is a decrease in level change for equal amounts of liquid added. This procedure can then be used to calibrate the risers for measuring leak rate at all levels as well as to plot attachment points and volumes of attached piping.

The principles of this invention can be used advantageously to determine the vertical location of any leak orifice that may be detected and to determine if a high water table exists which could affect the detected leak rate. Both of these determinations can be made by running the leak rate test and obtaining data at two discrete liquid levels in the riser.

If there is a high water table there is the possibility that external water pressure would prevent liquid in the tan from leaking out, even if a leak orifice exists. A test at one level might indicate no leak. By lowering the tank liquid level the internal pressure is reduced at the leak orifice. At that point the relatively higher external pressure would cause an "in" leak which would be detected.

Any effect of a high water table is eliminated by testing at two levels. If there is no leak, there will be no difference in the data between the two tests. If there is a leak, the higher level test will show a greater leak, no matter what the level of the water table.

The two level test procedure and calculations for determining leak location will now be discussed. The ability to maintain a constant liquid level permits this system to determine the elevation of leaks. The tank is first tested in the manner previously described at a liquid level near the top of the fill riser. The liquid level is then reduced by 15 to 18 inches and the test is repeated. This liquid level reduction reduces internal pressure by about 0.4 psi. The leak rates measured at the two levels are fed into the computer which then calculates the height of liquid level at which there would be no leak. The leak is not in the tank if this calculated level is few inches or more above the tank top. The calculation is based upon the following equation:

$$L = k\sqrt{H} \tag{5}$$

where L = leak rate
k = orifice constant
H = head pressure behind the leak.

From this equation and the two level tests, the following equations are developed:

$$L_1 = k_1 \sqrt{H_0 + h_1} \tag{6}$$

$$L_2 = k_2 \sqrt{H_0 + h_2} \tag{7}$$

$$k_2 = k_2 \text{ (same leak orifice)} \tag{8}$$

where
$H_O$=distance from the leak to the tank top
$L_1$=leak rate at level 1
$h_1$=level 1 height above tank top
$L_2$=leak rate at level 2
$h_2$=level 2 height above tank top
Solving the equations for $H_O$ results as follows:

$$\frac{L_1}{\sqrt{H_0 + h_1}} = \frac{L_2}{\sqrt{H_0 + h_2}} \tag{9}$$

$$HO = \frac{h_1 L_2 - h_2 L_1}{L_1^2 - L_2^2} \tag{10}$$

This last equation is solved by a program in the computer when the level heights and corresponding leak rates are given as input data. This equation is only valid when the liquid level does not change during the respective leak rate measurement, a significant characteristic of the preferred embodiment of this invention.

Note that FIG. 4 shows a plot of transferred liquid volume readings, V. If the slope of V on the strip chart changes appreciably there is an indication of a change in the leak situation. This will be confirmed by the two level test. It is also valuable for analysis to have a visual indication of volume trends with time.

This two level test to determine leak orifice height is important because a significant percentage of storage tank leaks are in the piping above the tank itself. The cost for digging up, locating the exact spot and repairing a leak in piping is relatively low, in the order of 5–15% of the cost for digging up the tank itself. By determining that the leak is above the top of the tank, significant costs can be saved in the actual location and repair process.

Figure 12:
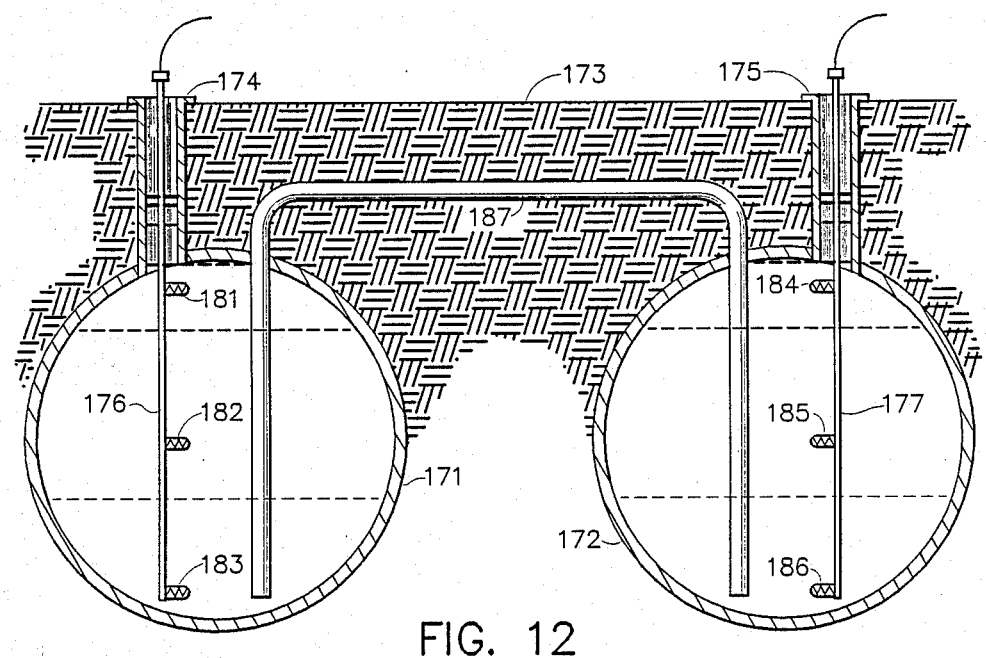
FIG. 12 schematically shows how siphoned tanks can be tested by this invention.

It is often the case that a tank installation, such as at a gasoline filling station, will have two or more storage tanks manifolded or coupled together by means of a siphon arrangement. With reference to FIG. 12 it can be seen that tanks 171 and 172 are located below ground level 173. Riser 174 is mounted in the top of tank 171 and riser 175 is mounted in the top of tank 172. Each riser is shown with a temperature probe 176 and 177 respectively. Probe 176 has top, middle and bottom thermal sensors 181, 182 and 183 respectively and probe 177 has similar sensors 184, 185 and 186.

The tanks are interconnected by means of a siphon tube 187. Either tank could be connected to a delivery pump. As the level is reduced in the pumping tank, liquid flows from the connected tank to maintain the level substantially equal. Similarly, liquid is added to one of the tanks when they are being filled. These connections are not shown because that is not necessary for purposes of this explanation. The same is true of the wire connections from the temperature probes to the computer.

All interconnected tanks can be tested for leak rate by a single installation of the present invention. In order to maintain constant level, liquid is added to or removed from one of those tanks during test. Total leak rate is determined by employing the following equation:

$$VL = \frac{(\Delta T_1 \times V_1 \times K_1) + (\Delta T_2 \times V_2 \times K_2)}{\Delta t} \tag{11}$$

where
$\Delta T_1$=temperature change in tank one
$\Delta T_2$=temperature ohange in tank two
$V_1$=the volume of tank one
$V_2$=the volume of tank two
$K_1$=the coefficient of volumetric expansion of the liquid in tank one
$K_2$=the coefficient of volumetric expansion of the liquid in tank two
$V_L$=the volume of liquid added to or removed from the tank during time period $\Delta t$.
$\Delta T$=the period of time.

If a leak is detected, it will then be necessary to disconnect the siphon tube and test each tank separately to determine where the leak is.

A somewhat modified procedure can be employed for determining leak rate for waste oil or other waste storage tanks. An automobile repair facility typically has a 500 gallon storage tank forwaste crank case oil or other waste petroleum products. The test procedure is modified because of the special problems dealing with heavy and waste oil products or other viscous liquids. Pumps, lines and valves can become fouled or clogged if small amounts of such material is pumped frequenty.

In this procedure, the tank is filled as usual and then a float, possibly of the type shown in FIG. 8, is used to create a reference level or zero point. After transients settle down, a test period such as ½ hour or one hour is run, with the usual temperature changes being applied to the coefficient of thermal expansion to obtain thermally caused volume change data. At the end of the test period the liquid level is brought back to the calibrated zero level and the amount of liquid added or removed is noted. Any suitable means, including hand held suction means and graduated beakers may be used for liquid volume determination. The volume of transferred liquid in gallons is divided by the time in hours to obtain volume leak rate. Then Equation (3) is applied, using temperature caused leak rate to arrive at the actual leak rate.

It is of interest to note that in comparison with the complex gear required for some prior art system, often requiring a dedicated automotive vehicle, the entire apparatus for this invention can easily be transported in a pick up truck and a single person can accomplish the test and provide the results to the station operator at that time. The system is essentially safe and no higher education is necessary beyond basic high school and minimum computer familiarity. The equipment can be calibrated in the field at that job site, including the thermistor in the bridge. Known precision resistance devices can be used for this purpose, substituted in the bridge for the thermistor.

Operator calculations and observations, critical to proper functioning of many earlier tank monitoring systems, are not required for proper operation of this system. This storage tank monitor provides leak rate monitor readings automatically, once it is set up.

By maintaining a constant liquid level in the tank under test with this system several advantages over previously available leak detection systems are realized. Tank end deflection varies cyclically when liquid level changes during test, as with most other leak detection systems. Even liquid level changes as small as 2-3 inches cause end wall deflection and produce an effectively varying leak rate as well as masking the effect of vapor pockets. Maintaining a constant liquid level eliminates the effects of tank end or side wall deflections.

Another benefit of the present constant level system is that leak rate measurements can be made at several precise levels, permitting calculation of the elevation of the leak, and detecting a low level "in" leak resulting from a high water table, as described above.

In view of the above description, it is likely that modifications and improvements will occur to those skilled in the art which are within the scope of the appended claims.

What is claimed is:

1. An automated liquid volume change monitoring system for a storage tank, said system comprising:
   level sensor means positioned to detect the existence of small changes from a predetermined liquid level in said tank;
   means for providing a signal from said level sensor means indicative of the existence of rise or fall of liquid level in said tank;
   liquid transport means responsive to said level sensor signal to maintain liquid level substantially constant by selectively adding liquid to and subtracting liquid from said tank, said liquid transport means functioning only when the liquid level in said tank is other than at said predetermined level;
   means for computing the volume of liquid change in said tank by measuring the liquid added to or removed from said tank as necessary to maintain substantially constant liquid level;
   means for providing a signal representative of liquid volume change due to the addition or removal of liquid from said tank;
   temperature sensing means operative to sense any incremental temperature change of the liquid within said tank;
   means for providing an output signal from said temperature sensing means representative of incremental change in temperature detected by said temperature sensing means;
   means responsive to said signal from said temperature sensing means to calculate tank liquid volume change due to incremental temperature change;
   means to provide a signal representing thermal liquid volume change;
   computation means responsive to said signal representing liquid volume change due to thermal changes and to said signal representing liquid volume change necessary to maintain substantially constant liquid level in said tank to provide a signal representing storage tank leak rate; and
   means for providing indication of the leak rate.

2. The storage tank monitoring system recited in claim 1, wherein said level sensor means comprises optical sensors.

3. The storage tank monitoring system recited in claim 1, further comprising:
   liquid flow pipe means extending form an external location and connecting with the liquid in said tank;
   said liquid transport means being connected in said flow pipe means;
   auxiliary tank means connected to said flow pipe means through said liquid transport means; and
   means connecting said rise and fall indication signal to said liquid transport means to energize said liquid transport means to transport said liquid between said storage tank and said auxiliary tank to maintain the liquid level in said storage tank substantially constant;
   said volume computing means being responsive to said rise anf all indication signal to calculate the amount of liquid transported between said storage tank and said auxiliary tank and provide a signal representing liquid volume change.

4. The storage tank monitoring system recited in claim 1, wherein said computation means comprises a programmed microcomputer.

5. The storage tank monitoring system recited in claim 3, wherein said liquid transport means comprises liquid adding means and liquid removal pump means, both coupled in said flow pipe means between said storage tank and said auxiliary tank, said pumps being actuated in response to the rise and fall indication signal.

6. The storage tank monitoring system recited in claim 1, wherein said indication means is human perceivable.

7. The storage tank monitoring system recited in claim 1, wherein said indication means comprises means to produce a strip chart record showing time increments and plotting liquid temperature, liquid volume change and leak rate related to the time increments shown thereon.

8. The storage tank monitoring system recited in claim 1, wherein said indication means comprises a video screen.

9. The storage tank monitoring system recited in claim 1, wherein said indication means comprises a computer storage disk.

10. The storage tank monitoring system recited in claim 3, wherein said computation means comprises a programmed microcomputer.

11. The storage tank monitoring system recited in claim 1, further comprising:
   liquid flow pipe means extending from an external location connecting with the liquid in said tank;
   said liquid transport means comprising level adjusting means connected in said flow pipe means;
   auxiliary tank means connected to said flow pipe means through said level adjusting means;
   precision weighing means coupled with said auxiliary tank means to accurately determine liquid weight differences within said auxiliary tank means;
   means to provide a signal to said volume computing means form said weighing means representing the weight of liquid in said auxiliary tank means; and
   means connecting said rise and fall indication signal to said level adjusting means to energize said level adjusting means to transport liquid between said storage tank and said auxiliary tank to maintain the liquid level in said storage tank substantially constant;
   said volume computing means being responsive to said weighing means signal to calculate the amount of liquid transported between said storage tank and said auxiliary tank and provide a signal representing liquid volume change.

12. The storage tank monitoring system recited in claim 11, wherein:

said flow pipe means comprises an inlet pipe and an outlet pipe;

said level adjusting means comprises a pump connected in said outlet pipe to transport liquid from said storage tank to said auxiliary tank;

said level adjusting means further comprising valve means connected in said inlet pipe to allow liquid to flow from said auxiliary tank to said storage tank under the force of gravity;

said level adjustment signal controlling the operation of said pump means and said valve means to maintain substantially constant liquid level in said storage tank.

13. The storage tank monitoring system recited in claim 1, further comprising:

liquid flow pipe means extending from an external location and connecting with the liquid in said tanks;

said liquid transport means comprising level adjusting means connected in said flow pipe means;

auxiliary tank means connected to said flow pipe means through said level adjusting means;

means connecting said rise and fall indication signal to said level adjusting means to energize said level adjusting means to transport said liquid between said storage tank and said auxiliary tank substantially constant;

precision flow metering means in said flow pipe means to accurately measure the volume of liquid required in a predetermined period of time to maintain substantially constant liquid level; and means for providing a signal from said flow metering means to said volume computing means representing the volume of liquid transported through said flow metering means;

said volume computing means being responsive to said flow metering means signal to calculate the net amount of liquid transported between said storage tank and said auxiliary tank and provide a signal representing liquid volume change in said storage tank.

14. The storage tank monitoring system recited in claim 13, wherein:

said flow pipe means comprises an inlet pipe and an outlet pipe;

said flow metering means comprises a flow meter connected in each said inlet and outlet pipe.

15. The storage tank monitoring system recited in claim 1, wherein said temperature sensing means comprises an electrically variable resistance means, the resistance of said resistance means being operative to change substantially proportionally to any said incremental temperature change of the liquid within said tank and wherein said means for providing an output signal from said temperature sensing means comprises a bridge circuit including said variable resistance as one leg thereof.

16. An automated liquid volume change monitoring system for a storage tank, said system comprising:

level sensor means positioned to detect the existence of small changes from a predetermined liquid level in said tank;

means for providing a signal from said level sensor means indicative of the existence of rise or fall of liquid level in said tank;

liquid flow pipe means extending from an external location into the liquid in said tank;

pump means connected in said flow pipe means;

auxiliary tank means connected to said flow pipe means through said pump;

temperature sensing means operative to sense any incremental temperature change of the liquid within said tank;

means for providing an output signal from said temperature sensing means representative of incremental change in temperature detected by said temperature sensing means;

means connecting said rise and fall indication signal to said pump means to energize said pump means to transport said liqid between said storage tank and said auxiliary tank to maintain the liquid level in said storage tank substantially constant;

means responsive to said rise and fall indication signal to calculate the amount of liquid transported between said storage tank and said auxiliary tank and provide a signal representing liquid volume change;

means responsive to said signal from said temperature sensing means to calculate tank liquid volume change due to temperature change;

means to provide a signal representing liquid volume change due to temperature change;

computation means responsive to said signal representing liquid volume change due to temperature change and to said signal representing actual volume change necessary to maintain substantially constant liquid level in said tank to provide a signal representing storage tank leak rate; and means for providing indication of the leak rate.

17. The storage tank monitoring system recited in claim 16, wherein said pump means comprises a liquid adding pump and a liquid removal pump, both coupled between said auxiliary tank and said storage tank in said flow pipe means, said liquid adding pump being actuated by said fall indication signal and said liquid removal pump being actuated by said rise indication signal.

18. The storage tank monitoring system recited in claim 16, wherein said computation means comprises a programmed microcomputer.

19. The storage tank monitoring system recited in claim 16, wherein said indication means is human perceivable.

20. The storage tank monitoring system recited in claim 16, wherein said indication means comprises an alpha-numeric printer which produces a strip chart record.

21. The storage tank monitoring system recited in claim 16, wherein said indication means comprises a video screen.

22. The storage tank monitoring system recited in claim 16, wherein said temperature sensing means comprises an electrically variable resistance means, the resistance of said resistance means being operative to change substantially proportionally to any said incremental temperature change of the liquid within said tank and wherein said means for providing an output signal from said temperature sensing means comprises a bridge circuit including said variable resistance as one leg thereof.

23. The storage tank monitoring system recited in claim 1, and further comprising:

a second storage tank;

means for connecting said storage tanks together so as to maintain the liquid level in both tanks substantially the same;

a second temperature sensing means positioned and operative to sense any incremental temperature change of the liqued within said second tank;

means for providing a second output signal from said second temperature sensing means representative of incremental change in temperature detected by said temperature sensing means;

means responsive to said second output signal to calculate second tank liquid volume change due to incremental temperature change;

means to provide a second signal representing thermal liquid volume change in said second tank; and means for combining said temperature sensing means output signal and said second signal representingg thermal liquid volume changes in both said tanks.

24. A method for automatically monitoring the change in volume of liquid in a storage tank, said method comprising the steps of:

establishing an initial reference liquid level;

detecting the existence of liquid level changes from said reference level in the storage tank after a predetermined period of time;

providing a signal representative of the detected liquid level change;

transporting liquid between the storage tank and an auxiliary tank pursuant to said liquid level change signal at the end of said period of time to bring the level of the liquid in the storage tank back to the reference level;

measuring the volume of liquid transported between the storage and auxiliary tanks;

providing a signal representing the volume of liquid transported between the storage and auxiliary tanks;

substantially automatically, periodically detecting temperature changes within the storage tank over said period of time;

providing signals representing said temperature changes;

periodically calculating the liquid volume change in the storage tank due to temperature changes;

averaging said calculated liquid volume changes over said period of time;

comparing the volume change of the liquid transported between the storage and auxiliary tanks and the calculated volume change due to temperature change in said period of time, calculating the leak rate of said storage tank from the volume changes due to measured level changes and temperature changes in said period of time; and providing indications of said leak rate.

25. The storage tank monitoring system recited in claim 3, wherein said liquid transport means comprises a liquid adding valve and a liquid removal pump, both said valve and said pump being coupled in said flow pipe means between in said storage tank and said auxiliary tank, said valve being actuated in response to the rise and fall indication signal.

26. The storage tank monitoring system recited in claim 25, wherein said liquid adding valve comprises a solenoid valve.

27. A method for automatically monitoring storage tank integrity, said method comprising the steps of:

detecting the existence of deviations of liquid level from a predetermined level in the storage tank;

providing a signal representative of the level deviation;

actuating liquid transporting means responsive to send level deviation signal to transport liquid between the storage tank and an auxiliary tank to maintain liquid level in the storage tank substantially constant, the liquid transporting means being actuated only when a deviation in liquid level from the predetermined level is detected, to thereby bring the level of the liquid in the storage tank to the predetermined level;

measuring the volume of liquid transported during a predetermined increment of time between the storage and auxiliary tanks;

providing a signal representing the volume of liquid transported between the storage and auxiliary tanks in the time increment;

substantially automatically detecting temperature changes within the storage tank substantially simultaneously with the time increment for measuring volume changes;

providing a signal representing said temperature changes;

calculating the liquid volume change in the storage tank due to temperature changes in that time increment;

comparing the volume change of the liquid transported between the storage and auxiliary tanks and the volume change due to temperature change in that time increment;

calculating the leak rate of said storage tank from the volume changes due to level changes and temperature changes in that time increment;

providing indications of said leak rate; and providing on-line statistical analysis by applying standard deviation calculations to a predetermined number of prior leak rate calculations to determine if leak rate data is statistically valid.

28. The method recited in claim 24, and comprising the further steps of:

comparing the calculated leak rate to a predetermined standard leak rate; and providing an indication of "pass" or "fail," depending on the results of said leak rate comparing step.

29. The method recited in claim 27, and comprising the further steps of:

providing a signal representing that the leak rate data is valid;

comparing the calculated leak rate to a predetermined standard leak rate; and providing an indication of "pass" or "fail", depending on the results of said leak rate comparing step.

* * * * *

UNITED STATES PATENT AND TRADEMARK OFFICE
CERTIFICATE OF CORRECTION

PATENT NO. : 4,827,762

DATED : May 9, 1989

INVENTOR(S) : Detlev E. M. Hasselmann

It is certified that error appears in the above-identified patent and that said Letters Patent is hereby corrected as shown below:

On the title page:
    [63] change "Jun. 26, 1988" to --filed Jun. 26, 1985--;
        change "Pat. No. 462,842" to --Pat. No. 4,672,842--.

Column 14, line 38, change "pumps" to --pump--.

Column 17, line 9 (Eq. 8), change "$k_2 = k_2$" to --$k_1 = k_2$--;
       line 22 (Eq. 10), change "$h_1L_2 - h_2L_1$" to --$h_1L_2^2 - h_2L_1^2$--.

Column 18, line 6 (Eq. 11), change "$$VL = \frac{(\Delta T_1 \times V_1 \times K_1) + (\Delta T_2 \times V_2 \times K_2)}{\Delta t}$$"

to --$$L = \frac{VL - [(\Delta T_1 \times V_1 \times K_1) + (\Delta T_2 \times V_2 \times K_2)]}{\Delta t}$$--.

Column 19, line 66, change "form" to --from--.

Column 20, line 12, change "anf all" to --and fall--;
       line 56, change "form" to --from--.

Column 21, line 20, change "tanks" to --tank--;
       line 29, after "tank" (second instance), insert --to maintain the liquid level in said storage tank--.

Column 22, line 15, change "liqid" to --liquid--.

UNITED STATES PATENT AND TRADEMARK OFFICE
CERTIFICATE OF CORRECTION

PATENT NO. : 4,827,762

DATED : May 9, 1989

INVENTOR(S) : Detlev E. M. Hasselmann

It is certified that error appears in the above-identified patent and that said Letters Patent is hereby corrected as shown below:

Column 23, line 6, change "liquied" to --liquid--;
          line 17, change "representingg" to --representing--.

Column 24, line 13, change "send" to --said--.

Signed and Sealed this

Twenty-third Day of January, 1990

*Attest:*

JEFFREY M. SAMUELS

*Attesting Officer*      *Acting Commissioner of Patents and Trademarks*